US010117310B2

(12) United States Patent
Nakamura

(10) Patent No.: US 10,117,310 B2
(45) Date of Patent: Oct. 30, 2018

(54) DEVICE CONTROL APPARATUS, DEVICE CONTROL SYSTEM, AND NON-TRANSITORY COMPUTER-READABLE MEDIUM THAT STORE DEVICE CONTROL PROGRAM

(71) Applicant: PANASONIC INTELLECTUAL PROPERTY MANAGEMENT CO., LTD., Osaka (JP)

(72) Inventor: Ryosuke Nakamura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/788,394

(22) Filed: Oct. 19, 2017

(65) Prior Publication Data

US 2018/0153022 A1 May 31, 2018

(30) Foreign Application Priority Data

Nov. 29, 2016 (JP) ................................. 2016-231018

(51) Int. Cl.
*H05B 37/02* (2006.01)
*H05B 41/392* (2006.01)
*F21V 23/04* (2006.01)

(52) U.S. Cl.
CPC ...... *H05B 37/0218* (2013.01); *F21V 23/0471* (2013.01); *H05B 37/0227* (2013.01); *H05B 41/3922* (2013.01); *H05B 37/0272* (2013.01)

(58) Field of Classification Search
CPC ............ H05B 37/0218; H05B 37/0272; H05B 41/3922; F21V 23/0471

USPC ............................................................ 315/158
See application file for complete search history.

(56) References Cited

U.S. PATENT DOCUMENTS

| 9,351,372 | B2* | 5/2016 | Nagashima | ........ H05B 37/0272 |
| 2008/0265799 | A1* | 10/2008 | Sibert | ................ H05B 37/0245 |
| | | | | 315/292 |
| 2014/0265881 | A1* | 9/2014 | Karc | .................... H05B 37/0272 |
| | | | | 315/158 |
| 2015/0305119 | A1* | 10/2015 | Hidaka | ............... H05B 37/0218 |
| | | | | 315/153 |

(Continued)

FOREIGN PATENT DOCUMENTS

| JP | H06-096868 A | 4/1994 |
| JP | H07-147191 A | 6/1995 |
| JP | H10-302538 A | 11/1998 |

(Continued)

*Primary Examiner* — Dylan White
(74) *Attorney, Agent, or Firm* — McDermott Will & Emery LLP

(57) ABSTRACT

A controller includes a connection determination unit configured to determine whether a device and a device control apparatus are directly communicatively connected to each other. The device control apparatus functions as a type 1 device control apparatus under a condition where the connection determination unit has determined that the device and the device control apparatus are directly communicatively connected to each other. On the other hand, the device control apparatus functions as a type 2 device control apparatus under a condition where the connection determination unit has determined that the device and the device control apparatus are not directly communicatively connected to each other.

4 Claims, 4 Drawing Sheets

(56) References Cited

U.S. PATENT DOCUMENTS

2017/0208671 A1* 7/2017 Kurihara ................ H04W 4/70
2018/0014386 A1* 1/2018 Bhutani ............. H05B 37/0272

FOREIGN PATENT DOCUMENTS

| JP | 2006-147383 A | 6/2006 | |
|---|---|---|---|
| JP | 2011-018466 A | 1/2011 | |
| JP | 2013-206812 A | 10/2013 | |
| JP | 2014-102909 A | 6/2014 | |
| JP | 2014-143090 A | 8/2014 | |
| WO | WO 2016124390 A1 * | 8/2016 | ......... H05B 37/0227 |

* cited by examiner

DEVICE CONTROL APPARATUS, DEVICE CONTROL SYSTEM, AND NON-TRANSITORY COMPUTER-READABLE MEDIUM THAT STORE DEVICE CONTROL PROGRAM

TECHNICAL FIELD

This application claims the benefit of priority based on Japanese Patent Application No. 2016-231018 filed on Nov. 29, 2016, the entire contents of which are incorporated herein by reference.

The present disclosure relates to a device control apparatus or the like which controls a device.

BACKGROUND ART

Conventionally, development has been conducted for a device control system including a device control apparatus which controls a device. As an example of such a device control system, a lighting control system is known.

A lighting control system includes a lighting control apparatus which turns on a lighting instrument when it is determined that a person is present in the lighting space, by using image data captured by an imager including an image sensor. The lighting control apparatus can be alternately switched between a first mode for detecting the presence or absence of a person in the lighting space using the image sensor and a second mode for detecting the brightness in the lighting space using the image sensor. With this, if detecting the presence of a person in the first mode, the lighting control apparatus changes the lighting state of the device, and on the other hand the lighting control apparatus performs dimming control on the device in the second mode such that the average brightness value of captured images is included within a target range.

An example of a technique related to the background art of the invention described above is disclosed in Japanese Patent Application Publication No. 2014-102909.

SUMMARY OF INVENTION

In the case where a remote controller is used to switch the first mode and the second mode of a device control apparatus, the device control apparatus, if installed at a position unreachable by radio waves of the remote controller, cannot be switched between the two modes.

For example, suppose the case where the remote controller is an infrared remote controller, and the device control apparatus is a lighting control apparatus. In this case, if the lighting control apparatus is installed to a ceiling at the position (20 m from the floor) that is too high for the infrared ray of the remote controller to reach (the reachable range is a little over ten meters), the infrared ray usually does not reach the lighting control apparatus. In such a case, the device control apparatus cannot be controlled with the remote controller.

If a radio wave repeater is provided between the device control apparatus and the remote controller to solve the above problem, however, the number of types of apparatuses included in the device control system will increase.

The present disclosure has been made in view of those problems that the conventional arts have. An object of the present disclosure is to provide a device control apparatus, the installation of which at a position that radio waves from the remote controller do not reach is achieved without increasing the number of types of apparatuses included in a device control system.

In addition, another object of the present disclosure is to provide a device control system including the foregoing device control apparatus, and a non-transitory computer-readable medium that stores a device control program which causes the foregoing device control apparatus to operate.

To solve the above problems, a device control apparatus according to a first aspect of the present disclosure is a device control apparatus including: a receiver configured to receive a control signal from an outside; and a controller capable of controlling a device based on the control signal received by the receiver, in which the device control apparatus selectively performs one of a first function as a type 1 device control apparatus which directly controls the device and a second function as a type 2 device control apparatus which, without directly controlling the device, controls another device control apparatus which functions as the type 1 device control apparatus, the controller includes a connection determination unit configured to determine whether the device and the device control apparatus are directly communicatively connected to each other, and the device control apparatus functions as the type 1 device control apparatus under a condition where the connection determination unit has determined that the device and the device control apparatus are directly communicatively connected to each other, and on the other hand, the device control apparatus functions as the type 2 device control apparatus under a condition where the connection determination unit has determined that the device and the device control apparatus are not directly communicatively connected to each other.

A device control system according to a second aspect of the present disclosure includes: a device control apparatus described above, which functions as the type 1 device control apparatus by receiving the predetermined control signal from the outside; and another device control apparatus described above, which functions as the type 2 device control apparatus by being controlled by the device control apparatus.

A non-transitory computer-readable medium that stores a device control program according to a third aspect of the present disclosure is a non-transitory computer-readable medium that stores a device control program configured to cause a computer embedded in a device control apparatus to operate as a receiver configured to receive a control signal from an outside and a controller capable of controlling a device based on the control signal received by the receiver, in which the device control program is capable of causing the computer to operate such that the device control apparatus selectively performs one of a first function as a type 1 device control apparatus which directly controls the device and a second function as a type 2 device control apparatus which, without directly controlling the device, controls another device control apparatus which functions as the type 1 device control apparatus, and the device control program causes the controller to function as a connection determination unit configured to determine whether the device and the device control apparatus are directly communicatively connected to each other, thereby causing the computer to operate such that the device control apparatus functions as the type 1 device control apparatus under a condition where the connection determination unit has determined that the device and the device control apparatus are directly communicatively connected to each other, and on the other hand, causing the computer to operate such that the device control apparatus functions as the type 2 device control apparatus under a condition where the connection determination unit has determined that the device and the device control apparatus are not directly communicatively connected to each other.

According to the present disclosure, it is possible to obtain a device control apparatus, the installation of which at a position that radio waves from the remote controller do not reach is achieved.

DESCRIPTION OF EMBODIMENTS

Hereinafter, descriptions will be provided for a device control system, a device control apparatus, and a device control program of an embodiment with reference to the drawings. On each drawing, the same part is denoted by the same reference sign. Descriptions of the same part denoted by the same reference sign will not be repeated for the explanation for each figure unless it is particularly necessary.

(Embodiment 1)

Figure 1:
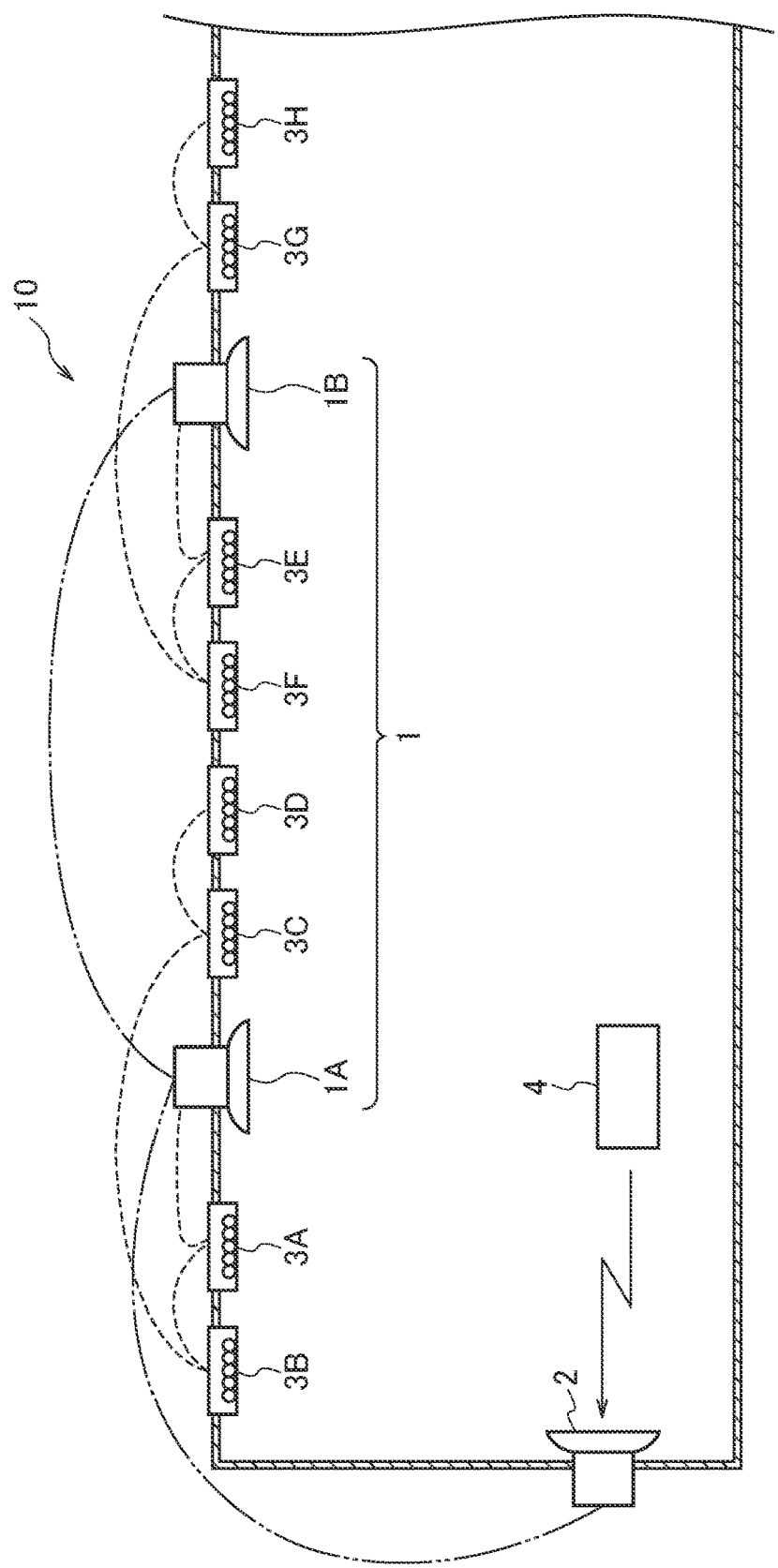
FIG. 1 is a schematic diagram illustrating the overall configuration of a device control system according to an embodiment of the present disclosure.

Using FIG. 1, descriptions will be provided for the overall configuration of a device control system of an embodiment.

As illustrated in FIG. 1, a device control system 10 of this embodiment includes type 1 device control apparatuses 1A and 1B, and a type 2 device control apparatus 2. The type 1 device control apparatuses 1A and 1B are installed to a ceiling surface to be exposed toward the room space. The type 2 device control apparatus 2 is installed to a wall surface to be exposed toward the room space.

As will be understood from the following explanation, in the case where the type 1 device control apparatuses 1A and 1B also function as sensors to detect the illuminance of the room space, the type 1 device control apparatuses 1A and 1B need to be installed such that the sensor units are exposed toward the room space. On the other hand, in the case where the type 2 device control apparatus 2 need not detect the illuminance of the room space, the type 2 device control apparatus 2 need not be installed such that the sensor unit is exposed to the room space, and it may be installed inside some sort of housing.

The type 1 device control apparatuses 1A and 1B and the type 2 device control apparatus 2 perform different functions when used as the device control system 10. However, immediately after the type 1 device control apparatuses 1A and 1B and the type 2 device control apparatus 2 are manufactured at a factory, they are completely the same products in terms of both hardware and software except for formal matters such as the product numbers.

The device control system 10 of the embodiment is for controlling devices 3A, 3B, 3C, 3D, 3E, 3F, 3G, and 3H. In this embodiment, each of the devices 3A, 3B, 3C, 3D, 3E, 3F, 3G, and 3H is a lighting instrument which emits light. The type 1 device control apparatuses 1A and 1B, and type 2 device control apparatus 2 of this embodiment control dimming (in the present specification, hereinafter, adjustment of illumination is referred as diming), toning, and the like of the lighting instruments. However, the devices 3A, 3B, 3C, 3D, 3E, 3F, 3G, and 3H may be any devices as long as they can be controlled by the device control apparatuses 1A, 1B, and 2 which will be described below.

The type 1 device control apparatus 1A transmits a control signal to the device 3A to control the device 3A. In addition, the type 1 device control apparatus 1A transmits a control signal to the device 3B via the device 3A to control the device 3B. The type 1 device control apparatus 1A transmits a control signal to device 3C via the devices 3A and 3B to control the device 3C. The type 1 device control apparatus 1A transmits a control signal to the device 3D via the devices 3A, 3B, and 3C to control the device 3D. In addition, the type 1 device control apparatus 1A transmits a control signal to the type 1 device control apparatus 1B.

The type 1 device control apparatus 1B receives the control signal sent from the type 1 device control apparatus 1A. The type 1 device control apparatus 1B transmits a control signal to the device 3E to control the device 3E. In addition, the type 1 device control apparatus 1B transmits a control signal to the device 3F via the device 3E to control the device 3F. The type 1 device control apparatus 1B transmits a control signal to the device 3G via the devices 3E and 3F to control the device 3G. The type 1 device control apparatus 1B transmits a control signal to the device 3H via the devices 3E, 3F, and 3G to control the device 3H.

In this embodiment, the type 2 device control apparatus 2 and the type 1 device control apparatus 1A are connected to each other via a signal line, and an electrical signal is transmitted as a control signal from the type 2 device control apparatus 2 to the type 1 device control apparatus 1A. The type 1 device control apparatus 1A and the type 1 device control apparatus 1B are also connected via a signal line, and an electrical signal is transmitted as a control signal from the type 1 device control apparatus 1A to the type 1 device control apparatus 1B. The type 1 device control apparatus 1A and the type 1 device control apparatus 1B are connected to the device 3A and the device 3E, respectively, via signal lines, and transmit electrical signals to the device 3A and the device 3E, respectively, as control signals.

The device 3A and the device 3B are connected to each other via a signal line, and an electrical signal is transmitted from the device 3A to the device 3B as a control signal. The device 3B and the device 3C are connected to each other via a signal line, and an electrical signal is transmitted from the device 3B to the device 3C as a control signal. The device 3C and the device 3D are connected to each other via a signal line, and an electrical signal is transmitted from the device 3C to the device 3D as a control signal.

The device 3E and the device 3F are connected to each other via a signal line, and an electrical signal is transmitted from the device 3E to the device 3F as a control signal. The device 3F and the device 3G are connected to each other via a signal line, and an electrical signal is transmitted from the device 3F to the device 3G as a control signal. The device 3G and the device 3H are connected to each other via a signal line, and an electrical signal is transmitted from the device 3G to the device 3H as a control signal.

In other words, the type 2 device control apparatus 2 and the type 1 device control apparatus 1A are connected in a daisy chain with signal lines. The type 1 device control apparatus 1A, the device 3A, the device 3B, the device 3C, and the device 3D are connected in a daisy chain with signal lines in this order. In addition, the type 2 device control apparatus 2, the type 1 device control apparatus 1A, and the type 1 device control apparatus 1B are connected in a daisy chain with signal lines in this order. The type 1 device control apparatus 1B, the device 3E, the device 3F, the device 3G, and the device 3H are connected in a daisy chain with signal lines in this order. However, the device control apparatuses described above may also communicate with each other by transmission and reception of wireless communication without being connected via signal lines described above. In addition, the device control apparatuses and the devices may also communicate with each other by transmission and reception of wireless communication without being connected via signal lines described above.

The type 2 device control apparatus 2 receives a control signal emitted as radio waves from a remote controller 4, and transmits the control signal to the type 1 device control apparatus 1A. The control signal specifies a control mode of diming and toning of the devices that were selected by the user operating the remote controller 4, in other words, the lighting instruments. In this embodiment, the remote controller 4 is a wireless device configured to transmit the control signal described above, for example, as infrared rays, and the type 2 device control apparatus 2 is a wireless device configured to receive the wireless signal transmitted by the remote controller 4. However, the remote controller 4 and the type 2 device control apparatus 2 may be connected to each other by wiring, and the control signal may be transmitted from the remote controller 4 to the type 2 device control apparatus 2 as an electrical signal via the wiring.

Using FIG. 2, functions of each device control apparatus of the embodiment will be described.

Figure 2:
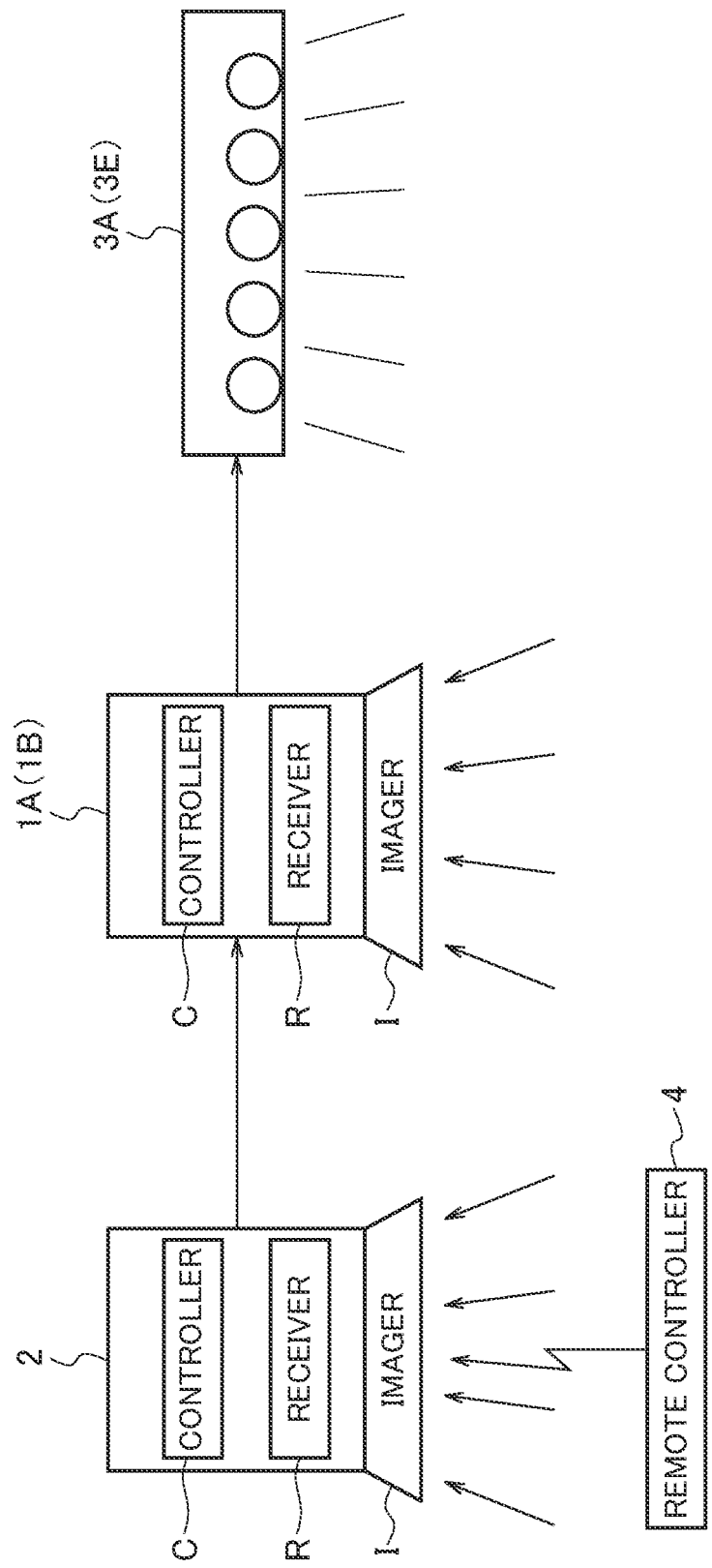
FIG. 2 is a function block diagram of a device control apparatus according to the embodiment of the present disclosure.

As illustrated in FIG. 2, the device control apparatuses 1A, 1B, and 2 of the embodiment include a receiver R configured to receive control signals from the outside and a controller C capable of controlling the device 3A or 3E based on the control signals received by the receiver R.

In addition, the device control apparatuses 1A, 1B, and 2 include an imager I capable of acquiring image data. The type 1 device control apparatuses 1A and 1B are installed to a ceiling surface so that the imager I can measure the illuminance of the room space. The type 2 device control apparatus 2 is installed to a wall surface in a state where the imager I can measure the illuminance of the room space.

With this, the controller C controls the lighting instruments as the devices 3A, 3B, 3C, 3D, 3E, 3F, 3G, and 3H based on the control signals received by the receiver R and the image data acquired by the imager I. Thus, it is possible to perform dimming and toning of the lighting instruments based on information acquired by the imager I on whether a person is present and information on the illuminance of the space.

The device control apparatuses selectively perform one of the following first function and second function. The first function is a function as the type 1 device control apparatus 1A or 1B which directly controls the device 3A or 3E. The second function is a function as the type 2 device control apparatus 2 which controls the type 1 device control apparatuses 1A or 1B without directly controlling the device 3A or 3E.

Note that in the case where a device control apparatus functions as the type 1 device control apparatus 1A or 1B, the device control apparatus is set to a state capable of performing a function as an illuminance sensor, while in the case where a device control apparatus functions as the type 2 device control apparatus 2, the device control apparatus may be set to a state not capable of performing a function as an illuminance sensor.

Figure 3:
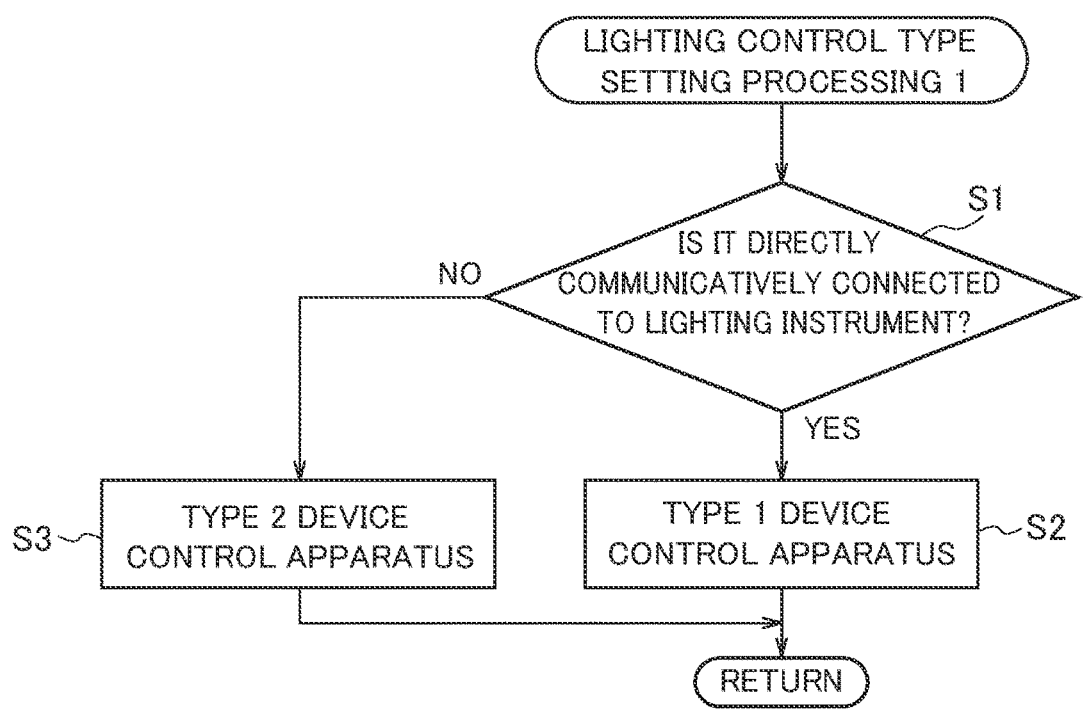
FIG. 3 is a flowchart for explaining lighting control type setting processing performed by a controller of a device control apparatus according to Embodiment 1 of the present disclosure.

Using FIG. 3, descriptions will be provided for lighting control type setting processing performed by the controller of the device control apparatus of the embodiment. The lighting control type setting processing is processing performed to select whether a device control apparatus is set as the type 1 device control apparatus 1A or 1B, or as the type 2 device control apparatus 2 at an initial setting of the device control system 10.

At step S1, it is determined whether each of the multiple device control apparatuses to be included in the device control system 10 is directly communicatively connected to any one of the devices 3A, 3B, 3C, 3D, 3E, 3F, 3G, and 3H, in other words, the lighting instruments. In a case where it is determined at step 1 that a device control apparatus is directly communicatively connected to a lighting instrument, the device control apparatus is set to function as the type 1 device control apparatus 1A or 1B at step 2. On the other hand, in a case where it is determined at step 1 that a device control apparatus is not directly communicatively connected to a lighting instrument, the device control apparatus is set to function as the type 2 device control apparatus 2 at step 3.

In other words, the controller C includes a connection determination unit Si configured to determine whether the device 3A or 3E and the device control apparatus 1A, 1B, or 2 are directly communicatively connected to each other. Note that in this embodiment, the expression "being directly communicatively connected" means that electrical connection is made in a mode where devices are able to directly receive and transmit a signal not via another device control apparatus in between.

As can be seen from FIG. 3, a device control apparatus functions as the type 1 device control apparatus 1A or 1B under a condition where the connection determination unit S1 has determined that the device 3A or 3E and the device control apparatus 1A, 1B, or 2 are directly communicatively connected to each other. On the other hand, a device control apparatus functions as the type 2 device control apparatus 2 under a condition where the connection determination unit S1 has determined that the device 3A or 3E and the device control apparatus 1A, 1B, or 2 are not directly communicatively connected to each other.

Note that as a condition on which a device control apparatus is set to function as the type 1 device control apparatus 1A or 1B, or as a condition on which the device control apparatus is set to function as the type 2 device control apparatus 2, another condition may be added.

As can be seen from the above, in this embodiment, each of the device control apparatuses 1A, 1B, and 2 can be selectively used as one of the type 1 device control apparatus 1A and 1B, and type 2 device control apparatus 2. Hence, it is possible to install the type 1 device control apparatuses IA and 1B at a position that radio waves from the remote controller 4 do not reach, without increasing the number of types of apparatuses included in the device control system 10. For example, it is possible to install device control apparatuses, which function as the type 1 device control apparatuses 1A and 1B, around a lighting instrument installed to a high ceiling.

In addition, even in the case where radio waves transmitted by the remote controller 4 do not reach the height of the type 1 device control apparatus 1A and B, if the radio waves reach the type 2 device control apparatus 2, it is possible to cause the type 1 device control apparatuses 1A and 1B to control dimming and toning of the lighting instruments.

Note that to the device control apparatus of this embodiment, a device control program is installed from an external recording medium. This device control program causes a computer embedded in each of the device control apparatuses 1A, 1B, and 2 to function as the receiver R that receives a control signal from the outside and the controller C capable of controlling the device 3A or 3E based on the control signal received by the receiver R.

(Embodiment 2)

Device control apparatuses of Embodiment 2 will be described with reference to FIG. 4. The device control apparatuses of this embodiment are almost the same as those in Embodiment 1. For this reason, hereinafter, descriptions will be provided mainly for the differences between the device control apparatuses of this embodiment and those in Embodiment 1.

Figure 4:
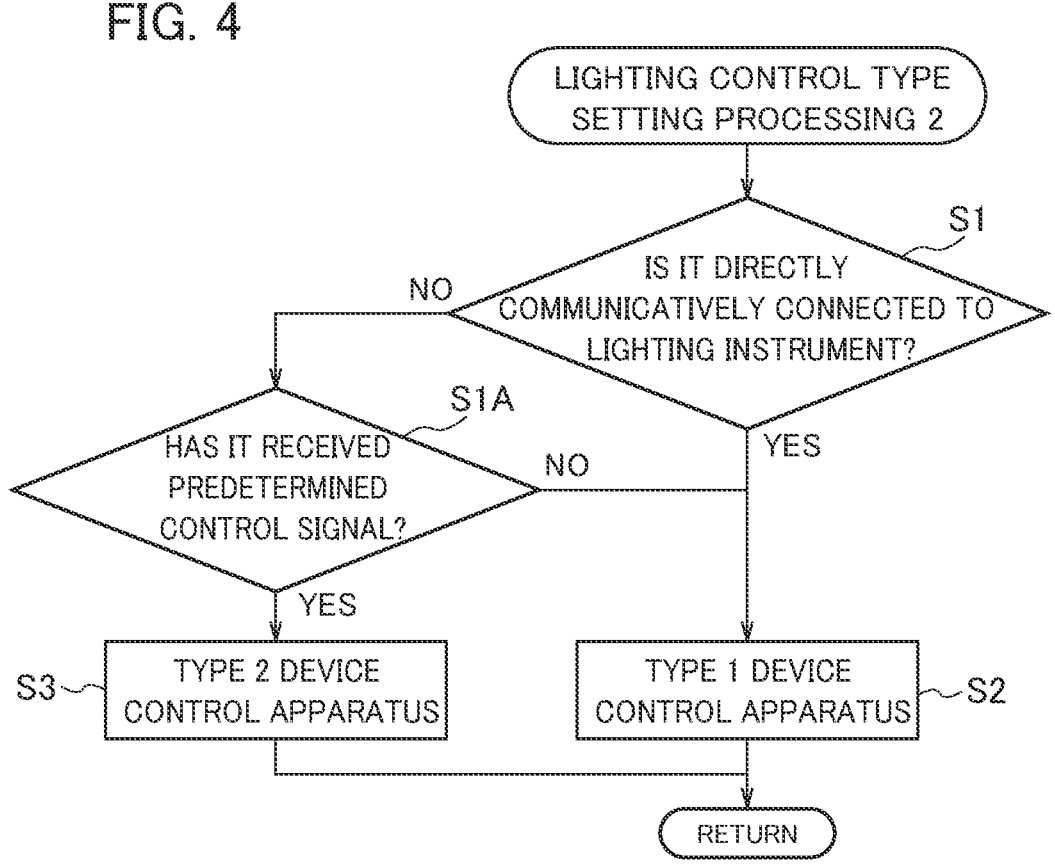
FIG. 4 is a flowchart for explaining lighting control type setting processing performed by a controller of a device control apparatus according to Embodiment 2 of the present disclosure.

Using FIG. 4, descriptions will be provided for lighting control type setting processing performed by a controller of the device control apparatus of Embodiment 2.

As illustrated in FIG. 4, in a case where it is determined at step 1 that a device control apparatus and a lighting instrument are not directly communicatively connected to each other, it is determined whether a receiver R has received a predetermined control signal from the outside. In other words, in device control apparatuses 1A, 1B, and 2 of this embodiment, a controller C includes a reception determination unit S1A configured to determine whether the receiver R has received the predetermined control signal from the outside, in addition to the configuration of the device control apparatuses 1A, 1B, and 2 of Embodiment 1. The predetermined control signal is a command that is transmitted only before the device control system 10 is used and that sets the device control apparatus that has received the command, to function as a type 1 device control apparatus.

The device control apparatuses 1A, 1B, and 2 function as the type 1 device control apparatus 1A or 1B under a condition where the reception determination unit S1A has determined that the receiver R has not received the predetermined control signal from the outside. On the other hand, the device control apparatuses 1A, 1B, and 2 function as a type 2 device control apparatus 2 under a condition where the reception determination unit S1A has determined that the receiver R has received the predetermined control signal from the outside.

With this, in the case a device control apparatus that should originally function as the type 1 device control apparatus 1A or 1B erroneously receives the control signal in the state where it is not connected to any device, it is possible to prevent the device control apparatus from erroneously functioning as the type 2 device control apparatus 2. In addition, it is possible to prevent a device control apparatus that should originally function as the type 1 device control apparatus 1A or 1B from erroneously functioning as the type 2 device control apparatus 2.

Figure 5:
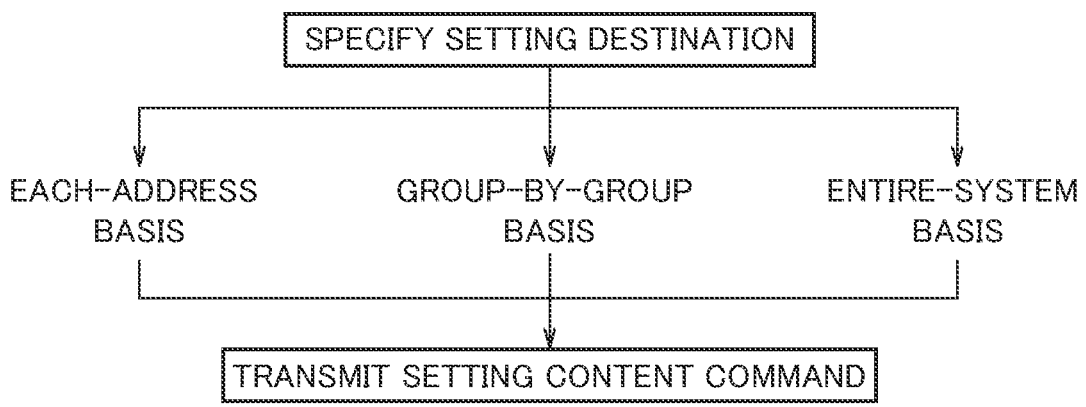
FIG. 5 is a flowchart for explaining control performed after the lighting control type setting processing of the device control apparatus according to the embodiment of the present disclosure.

Using FIG. 5, descriptions will be provided for control performed after the lighting control type setting processing of the device control apparatuses in each embodiment described above.

As illustrated in FIG. 5, the following three kinds of approaches are conceivable as an approach for the device control apparatuses 1A and 1B to control a plurality of devices. A first approach is one in which the device control apparatuses 1A and 1B control each of the plurality of devices separately using an address given to each device (an each-address basis). A second approach is one in which some of the multiple devices are combined into a group and the device control apparatuses 1A and 1B control each of the plurality of groups (a group-by-group basis). In addition, the type 1 device control apparatuses 1A and 1B may perform the same control for all of the plurality of devices included in the device control system (an entire-system basis). The remote controller 4, first, transmits a command that designates one of the control on the each-address basis, the control on the group-by-group basis, and the control on the entire-system basis, to the type 2 device control apparatus 2. After that, the remote controller 4 transmits a command for controlling the devices. Hence, the above three approaches can be mutually changed.

Generally, in the case where the room space has a window or an opening, and the reflectance of light on the floor surface and the wall surfaces surrounding the room space is high, the type 1 device control apparatuses 1A and 1B installed to the ceiling may mistakenly recognize the illuminance because the light entering from the window or the opening is reflected on the floor and the walls. In this case, since the type 2 device control apparatus 2 of this embodiment is installed to a wall surface such that an imager I is able to measure the illuminance of the room space, the type 2 device control apparatus 2 can measure an approximate value of the illuminance of light entering from the window or the opening. Hence, for example, the control mode corresponding to the illuminance acquired by the type 1 device control apparatus 1A or 1B may be changed, depending on the condition of the amount of light entering from the window or the opening into the room space, such as large, medium, and small.

Hereinafter, descriptions will be provided for a characteristic configuration of the device control apparatus, the device control system, and a device control program of the embodiment, and advantageous effects obtained therefrom.

(1) The device control apparatuses 1A, 1B, and 2 of the embodiment include the receiver R configured to receive control signals from the outside and the controller C capable of controlling the device 3A or 3E based on the control signals received by the receiver R. The device control apparatuses 1A, 1B, and 2 selectively perform one of the first function and the second function. The first function is a function as the type 1 device control apparatus 1A or 1B which directly controls the device 3A or 3E. The second function is a function as the type 2 device control apparatus 2 which controls other device control apparatuses 1A and 1B functioning as the type 1 device control apparatuses 1A and 1B without directly controlling the device 3A or 3E. The controller C includes a connection determination unit Si which determines whether the device 3A or 3E and the device control apparatus 1A, 1B, or 2 are directly communicatively connected to each other. A device control apparatus functions as the type 1 device control apparatus 1A or 1B under a condition where the connection determination unit S1 has determined that the device 3A or 3E and the device control apparatus 1A, 1B, or 2 are directly communicatively connected to each other. On the other hand, a device control apparatus functions as the type 2 device control apparatus 2 under a condition where the connection determination unit S1 has determined that the device 3A or 3E and the device control apparatus 1A, 1B, or 2 are not directly communicatively connected to each other.

According to the above configuration, a single device control apparatus 1A, 1B, or 2 can be selectively used as one of the type 1 device control apparatus 1A and 1B, and type 2 device control apparatus 2. With this, it is possible to install the type 1 device control apparatuses 1A and 1B at a position that radio waves from the remote controller 4 do not reach, without increasing the number of types of apparatuses included in the device control system 10.

(2) The controller C may include the reception determination unit S1A which determines whether the receiver R has received the predetermined control signal from the outside in a case where the connection determination unit S1 has determined that the device 3A or 3E and the device control apparatus 1A, 1B, or 2 are not directly communicatively connected to each other. In this case, the device control apparatuses 1A, 1B, and 2 function as the type 1 device control apparatuses 1A or 1B under a condition where the reception determination unit S1A has determined that the receiver R has not received the predetermined control signal from the outside. On the other hand, the device control apparatuses 1A, 1B, and 2 function as the type 2 device control apparatus 2 under a condition where the reception determination unit S1A has determined that the receiver R has received the predetermined control signal from the outside.

With this, it is possible to prevent a device control apparatus that should originally function as the type 1 device control apparatuses 1A or 1B from erroneously functioning as the type 2 device control apparatus 2.

(3) The devices 3A, 3B, 3C, 3D, 3E, 3F, 3G, and 3H may be lighting instruments. The device control apparatuses 1A, 1B, and 2 may further include the imager I capable of acquiring image data. In this case, it is preferable that the controller C control the lighting instruments based on the control signal received by the receiver R and the image data acquired by the imager I.

According to the above configuration, it is possible to install a device control apparatus that functions as the type 1 device control apparatus 1A or 1B in the vicinity of a lighting instrument installed at a high position.

(4) The device control system 10 according to the embodiment includes a first device control apparatus that functions as the type 2 device control apparatus 1A or 1B described above by receiving the predetermined control signal from the outside. The device control system 10 includes a second device control apparatus that functions as the type 2 device control apparatus 1 described above by being controlled by the above device control apparatus.

(5) The medium of the embodiment is a non-transitory computer-readable medium that stores a device control program. The device control program causes a computer embedded in each of the device control apparatuses 1A, 1B, and 2 to operate as the receiver R configured to receive a control signal from the outside and the controller C capable of controlling the device 3A or 3E based on the control signal received by the receiver R.

In this disclosure, part or all of the units, the devices, the parts, and the portions or a function of any of the block diagram illustrated in FIG. 2 may be implemented as one or more of electronic circuits including a semiconductor device, a semiconductor integrated circuit (IC), or an LSI. However, the disclosure is not limited thereto. The LSI or the IC can be integrated on one chip and can also be a combination of a plurality of chips. For example, function blocks other than a memory may be integrated on one chip. The name used here is an LSI or an IC, but it can also be called a system LSI, a very large scale integration (VLSI), or an ultra large scale integration (ULSI) depending on the level of integration. A field programmable gate array (FPGA) which can be programmed after manufacturing the LSI, or a reconfigurable logic element in which the connections or settings of the circuit cells in the LSI can be reconfigured, can be used for the same purpose. Further, all or part of a function or operation of the units, the devices, the parts, the portions, or the function blocks may be implemented by executing software (one or more programs). In such a case, the software can be stored in more than one non-transitory recording media such as a ROM, an optical disc, or a hard disc drive and can be executed by a processor. The software causes the processor with the peripheral apparatuses to execute the functions specified by the software. The system or apparatus may include one or more non-transitory recording media on which the software is recorded and a processor with a necessary hardware apparatus, such as an interface.

The invention claimed is:

1. A device control apparatus comprising:
a receiver configured to receive a control signal from an outside; and
a controller capable of controlling a device based on the control signal received by the receiver, wherein
the device control apparatus selectively performs one of a first function as a type 1 device control apparatus which directly controls the device and a second function as a type 2 device control apparatus which, instead of directly controlling the device, controls another device control apparatus which functions as the type 1 device control apparatus,
the controller includes a connection determination unit configured to determine whether the device and the device control apparatus are directly communicatively connected to each other, and
the device control apparatus functions as the type 1 device control apparatus under a condition where the connection determination unit has determined that the device and the device control apparatus are directly communicatively connected to each other, and
the device control apparatus functions as the type 2 device control apparatus under a condition where the connection determination unit has determined that the device and the device control apparatus are not directly communicatively connected to each other, wherein
the controller includes a reception determination unit configured to determine whether the receiver has received a predetermined control signal from the outside in a case where the connection determination unit has determined that device and the device control apparatus are not directly communicatively connected to each other,
the device control apparatus functions as the type 1 device control apparatus under a condition where the reception determination unit has determined that the receiver has not received the predetermined control signal from the outside, and on the other hand, and
the device control apparatus functions as the type 2 device control apparatus under a condition where the reception determination unit has determined that the receiver has received the predetermined control signal from the outside.

2. The device control apparatus according to claim 1, wherein
the device is a lighting instrument,
the device control apparatus further comprises an imager capable of acquiring image data, and the controller controls the lighting instrument based on the control signal received by the receiver and the image data acquired by the imager.

3. A device control system comprising:
a first device control apparatus according to claim 1, which functions as the type 2 device control apparatus by receiving the predetermined control signal from the outside; and
a second device control apparatus according to claim 1, which functions as the type 1 device control apparatus by being controlled by the device control apparatus.

4. A non-transitory computer-readable medium that stores a device control program causing a computer embedded in a device control apparatus to operate as
a receiver configured to receive a control signal from an outside and
a controller capable of controlling a device based on the control signal received by the receiver, wherein
the device control program causes the computer to operate such that the device control apparatus selectively performs one of a first function as a type 1 device control apparatus which directly controls the device and a second function as a type 2 device control apparatus which, instead of directly controlling the device, controls another device control apparatus which functions as the type 1 device control apparatus, and
the device control program causes the controller to function as a connection determination unit configured to determine whether the device and the device control apparatus are directly communicatively connected to each other, thereby causing the computer to operate such that the device control apparatus functions as the type 1 device control apparatus under a condition where the connection determination unit has determined that the device and the device control apparatus are directly communicatively connected to each other, and
causing the computer to operate such that the device control apparatus functions as the type 2 device control apparatus under a condition where the connection determination unit has determined that the device and the device control apparatus are not directly communicatively connected to each other, wherein
the controller includes a reception determination unit configured to determine whether the receiver has received a predetermined control signal from the outside in a case where the connection determination unit has determined that the device and the device control apparatus are not directly communicatively connected to each other, the device control apparatus functions as the type 1 device control apparatus under a condition where the reception determination unit has determined that the receiver has not received the predetermined control signal from the outside, and on the other hand, and
the device control apparatus functions as the type 2 device control apparatus under a condition where the reception determination unit has determined that the receiver has received the predetermined control signal from the outside.

* * * * *